US011522818B2

(12) United States Patent
Higgins et al.

(10) Patent No.: US 11,522,818 B2
(45) Date of Patent: Dec. 6, 2022

(54) BOT SUPERVISION

(71) Applicant: LIVEPERSON, INC., New York, NY (US)

(72) Inventors: Michael Higgins, New York, NY (US); Xi Chen, New York, NY (US); Chuqinh He, New York, NY (US); Ender Ricart, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/475,725

(22) Filed: Sep. 15, 2021

(65) Prior Publication Data

US 2022/0086108 A1 Mar. 17, 2022

Related U.S. Application Data

(60) Provisional application No. 63/078,718, filed on Sep. 15, 2020.

(51) Int. Cl.

| *H04L 51/02* | (2022.01) |
| *G06N 20/00* | (2019.01) |
| *G06K 9/62* | (2022.01) |
| *H04L 51/216* | (2022.01) |
| *G06N 5/04* | (2006.01) |
| *G06Q 10/10* | (2012.01) |
| *G06N 3/08* | (2006.01) |

(52) U.S. Cl.
CPC ............ *H04L 51/02* (2013.01); *G06K 9/6256* (2013.01); *G06K 9/6267* (2013.01); *G06N 20/00* (2019.01); *H04L 51/216* (2022.05); *G06N 3/08* (2013.01); *G06N 5/04* (2013.01); *G06Q 10/10* (2013.01)

(58) Field of Classification Search
CPC .......... G06N 5/04; G06N 3/08; G06N 3/0454; G06N 3/0445; G06N 20/00; H04L 51/02; H04L 51/16; H04L 67/02; H04L 67/327; G06Q 10/10; G06Q 10/107
See application file for complete search history.

(56) References Cited

U.S. PATENT DOCUMENTS

2018/0322403 A1* 11/2018 Ron ........................ H04L 51/02

OTHER PUBLICATIONS

International Search Report and Written Opinion dated Dec. 13, 2021 for PCT Application No. PCT/US2021/050401, 12 pages.
Mohammad Forkan Abdur Rahim et al., "ECHO: a Tool for Empirical Evaluation Cloud Chatbots", 2020 20th IEEE/ACM International Symposium on Cluster, Cloud and Internet Computing, May 1, 2020, pp. 669-672 XPO55869269.

* cited by examiner

*Primary Examiner* — Kyung H Shin
(74) *Attorney, Agent, or Firm* — Polsinelli LLP

(57) ABSTRACT

The present disclosure relates generally to facilitating routing of communications. More specifically, techniques are provided to dynamically routing messages having multiple intents between bots and terminal devices during communication sessions configured with multi-channel capabilities.

36 Claims, 14 Drawing Sheets

BOT SUPERVISION

CROSS-REFERENCE TO RELATED APPLICATION

The present patent application claims the priority benefit of U.S. provisional patent application No. 63/078,718 titled "Bot Supervision" and filed Sep. 15, 2020, the disclosure of which is incorporated by reference herein.

FIELD

The present disclosure relates generally to bot operation and training. More specifically, techniques are provided to supervision of bot operation and training.

BACKGROUND

Presently available bots may operate from a model. Although the model may be updated over time, bot errors, failures, or other operational breakdowns may nevertheless occur. As such, businesses may employ human agents to take over from such bot failures in order to meet customer needs and expectations. Requiring human agents to take over various tasks may be time-intensive, however, and the bots may continue to break down until the model is updated at some point in time. There is, therefore, a need in the art for improved methods and systems for supervising bot operation and training.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain embodiments of the present disclosure include a computer-implemented method. The method may include storing a set of supervision criteria in memory that includes a threshold level of confidence, monitoring one or more messages in a conversation between a bot and a user of a client device, detecting that a bot prediction associated with the conversation fails to meet the threshold level of confidence, requesting input from an agent device that provides classification input regarding the conversation, routing the conversation to one or more endpoint devices in accordance with the classification input, updating a learning model based on the classification input, and providing for use of the updated learning model by the bot to make a next bot prediction.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
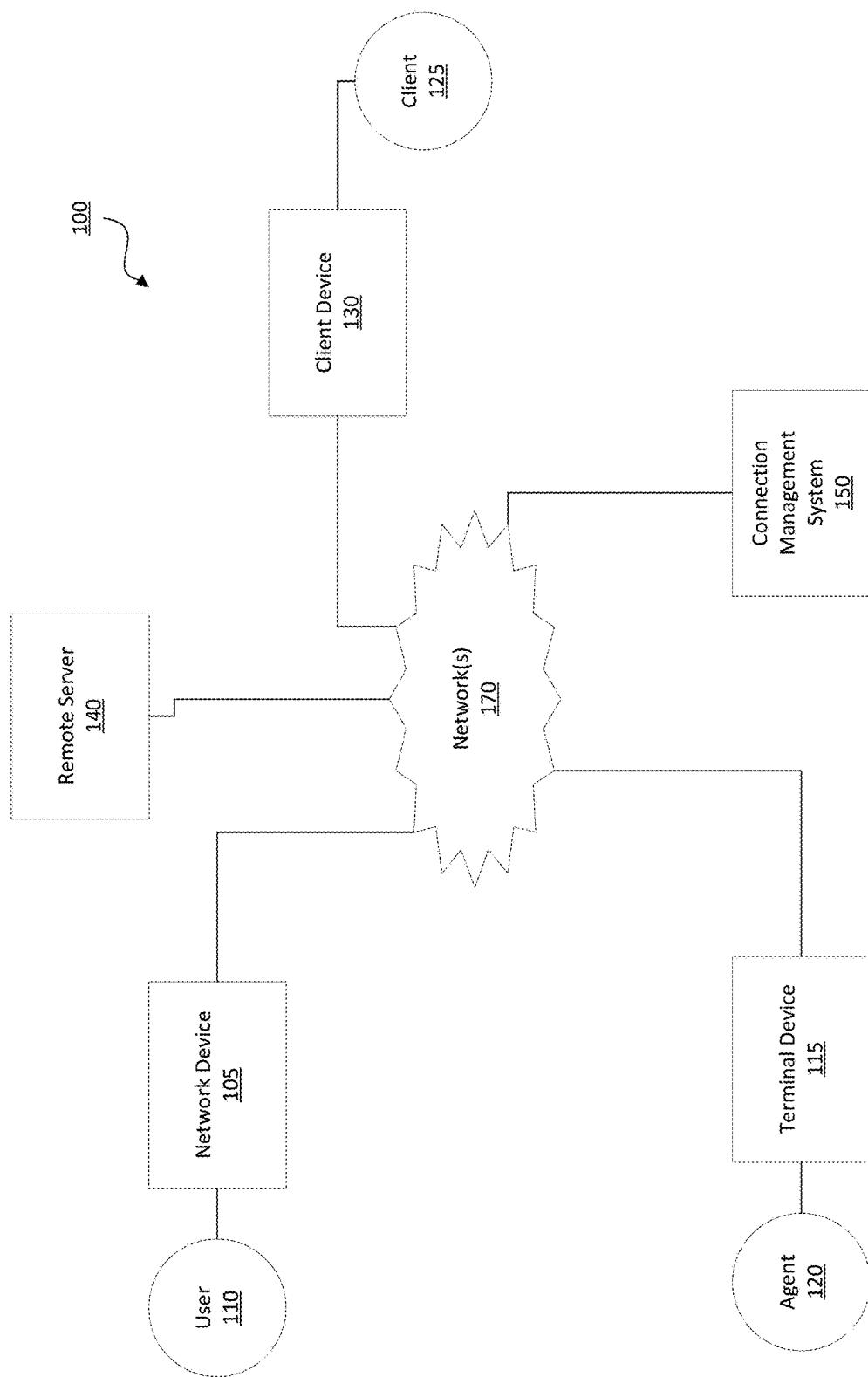
FIG. 1 shows a block diagram of an embodiment of a network interaction system.

FIG. 1 shows a block diagram of an embodiment of a network interaction system 100 which implements and supports certain embodiments and features described herein.

Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent tasked with providing support or information to the user 110 regarding the website or online service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a representative employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
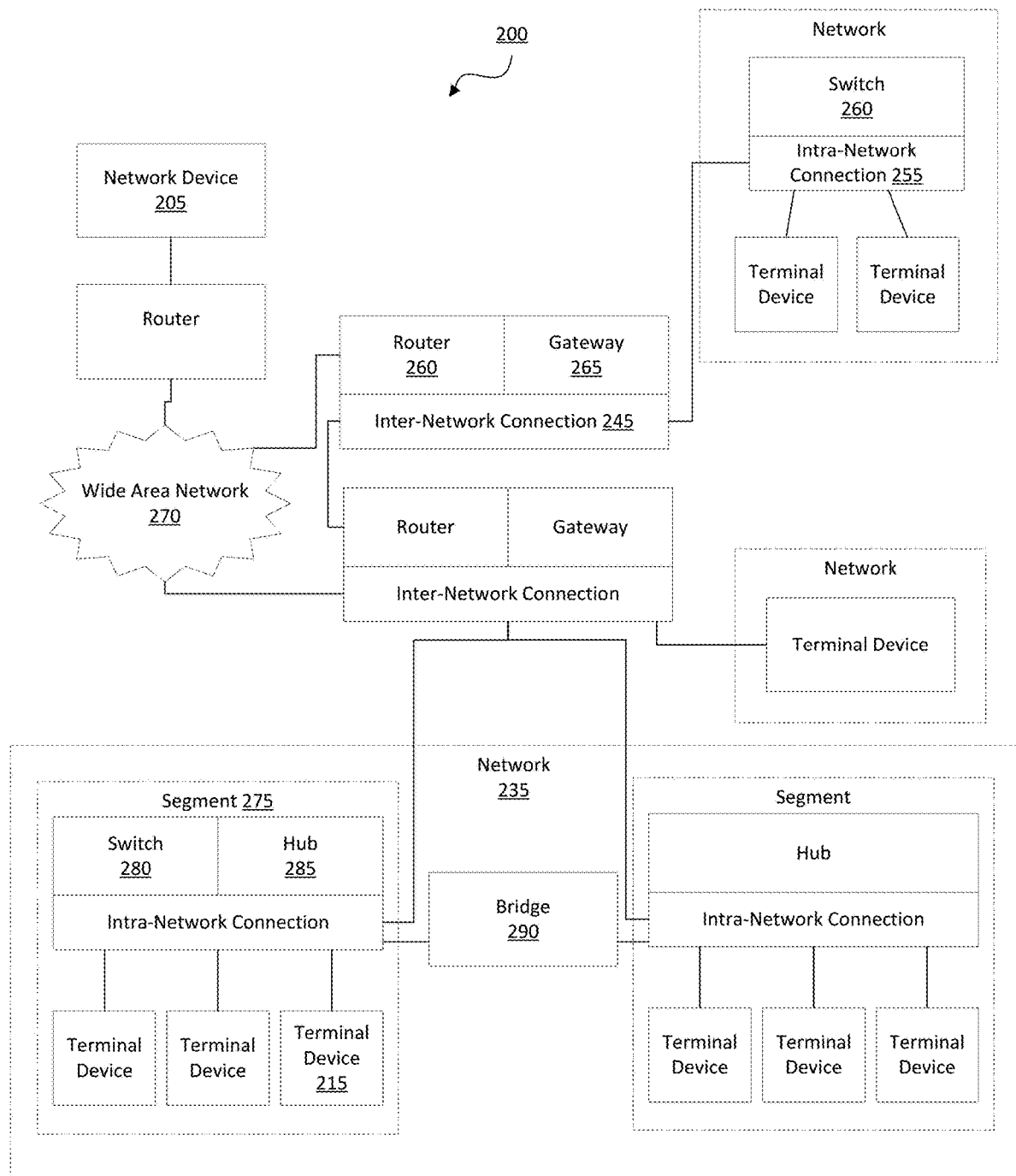
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
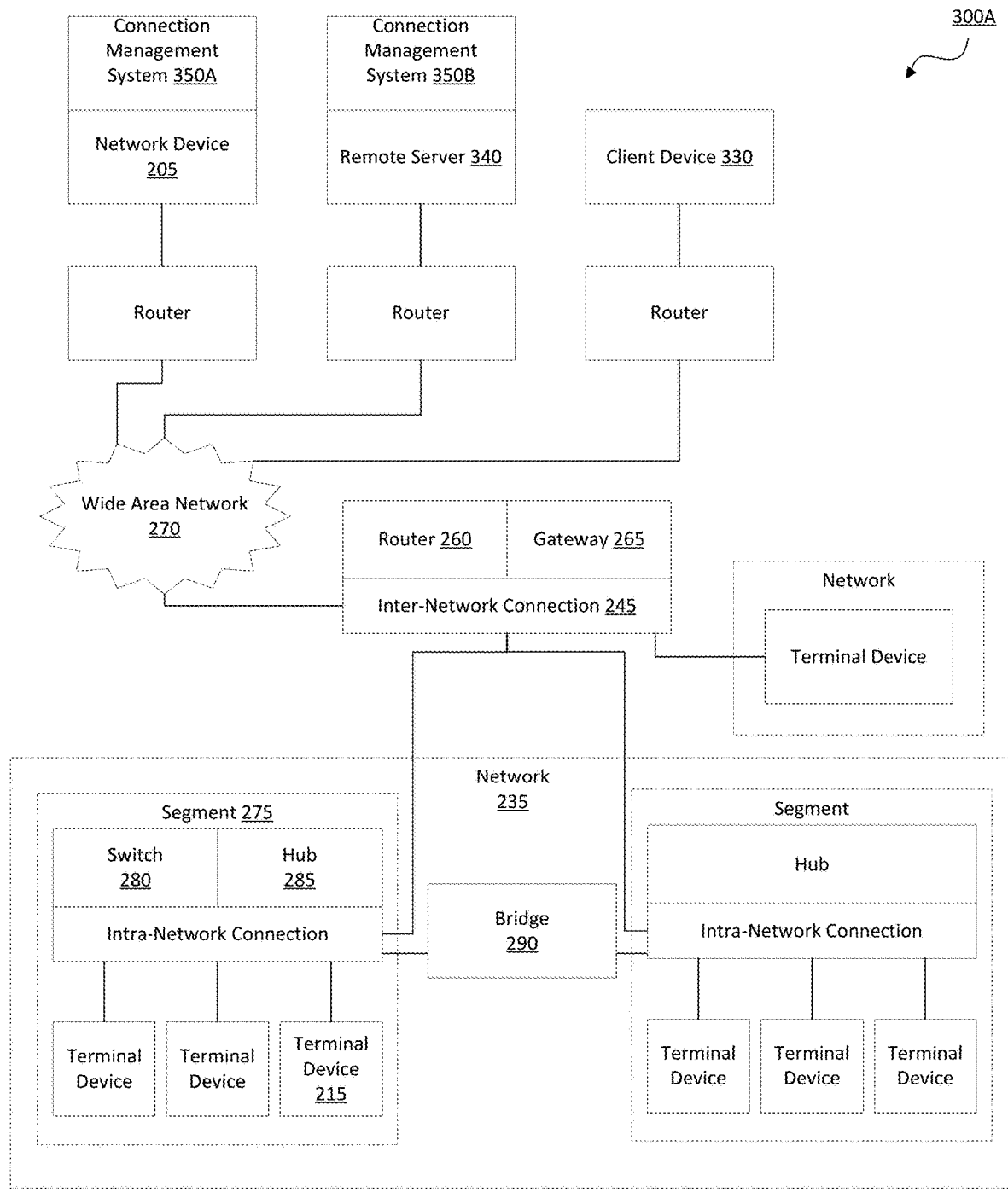
FIGS. 3A-3C show block diagrams of other embodiments of a network interaction system that includes a connection management system.
Figure 3B:
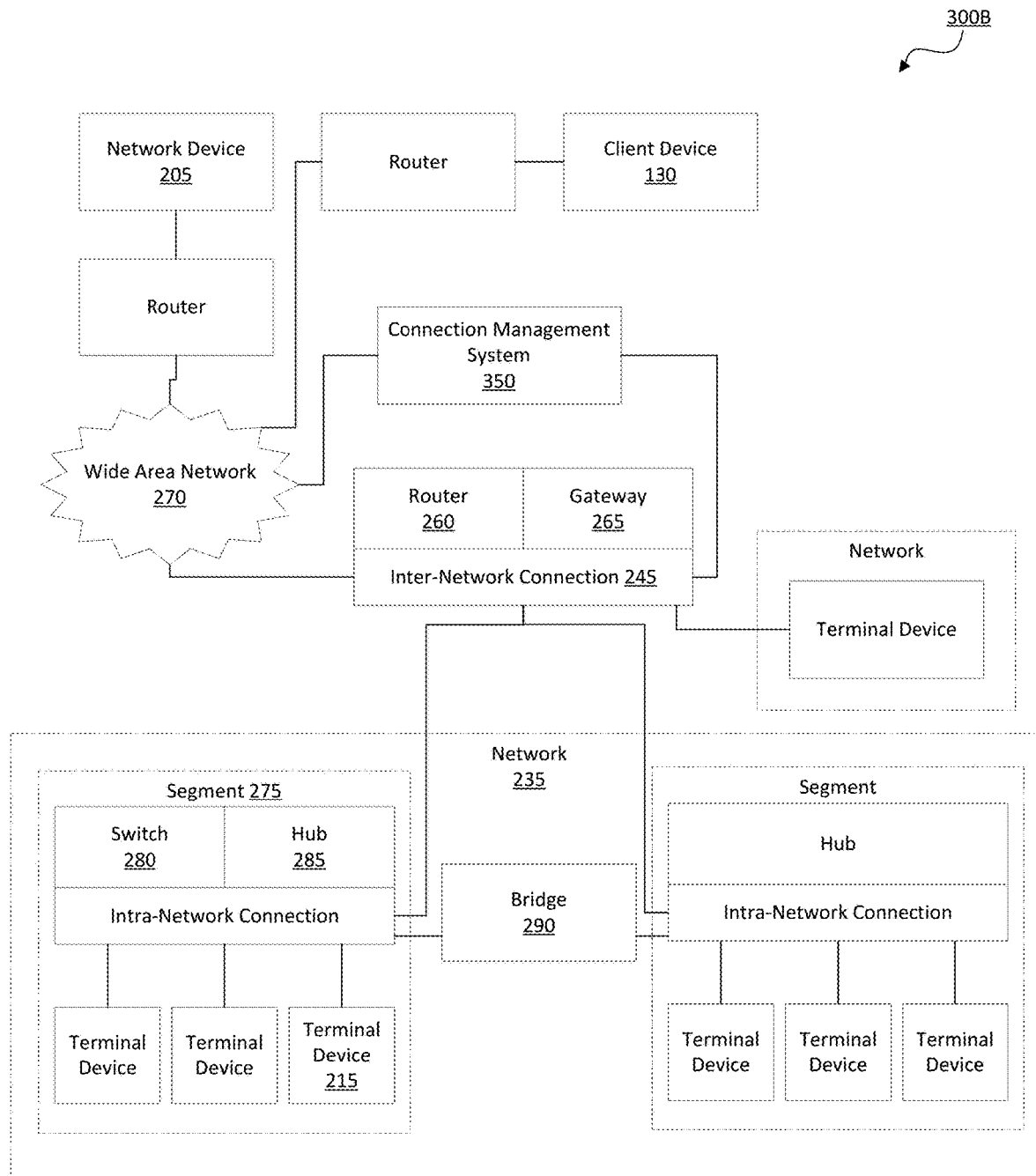
Figure 3C:
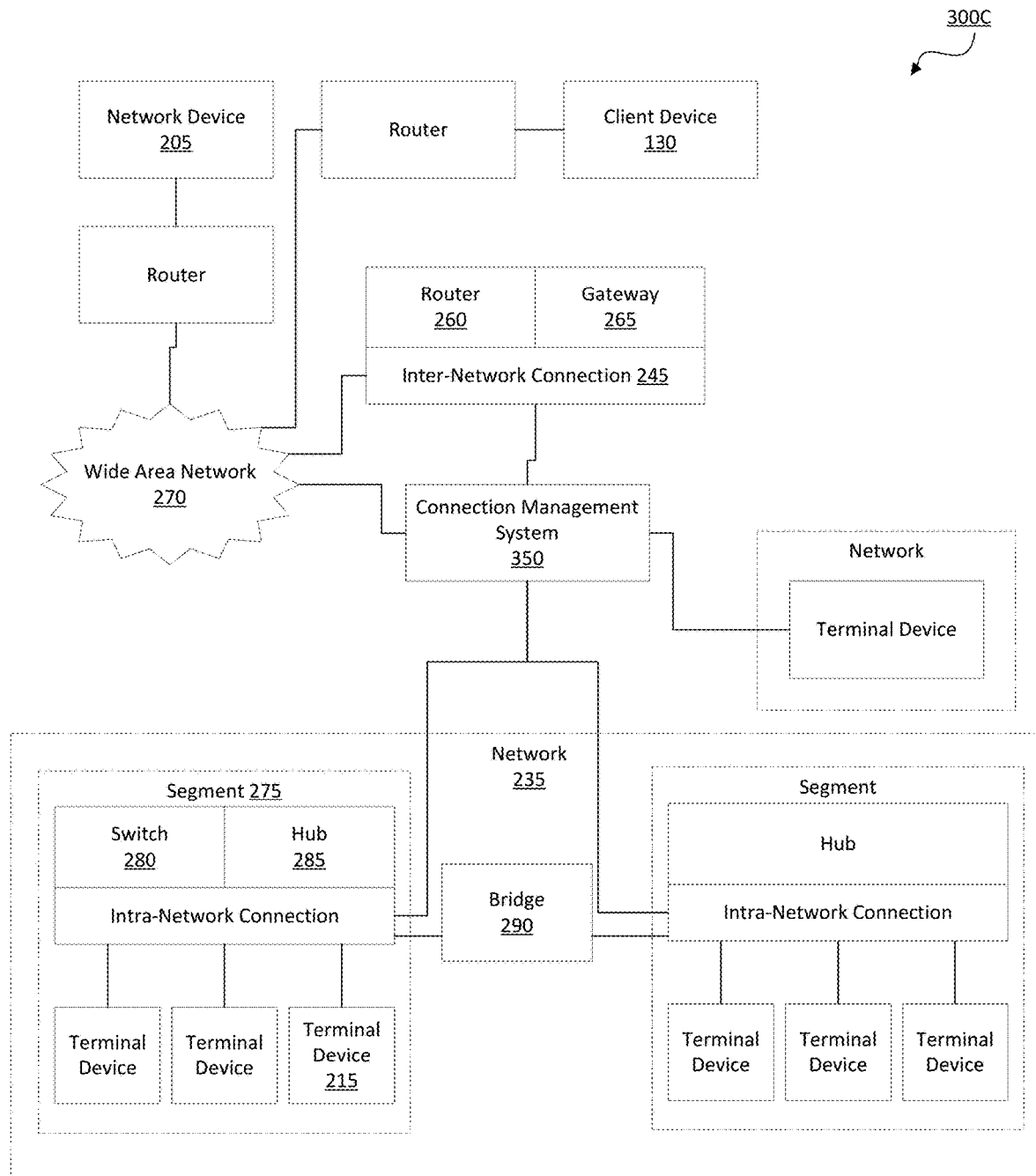

FIGS. 3A-3C show block diagrams of other embodiments of a network interaction system 300*a-c* that includes a connection management system. Each of the depicted systems 300*a-c* show only 2 local-area networks 235 for simplicity, though it can be appreciated that embodiments can be extended to expand the number of local-area networks. Each of systems 300*a-c* include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350*a* is associated with network device 205 and connection management system 350*b* is associated with remote server 340). For example, connection management system 350*a* and/or connection management system 350*b* can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350*b* executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, connection management system 350*b* may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
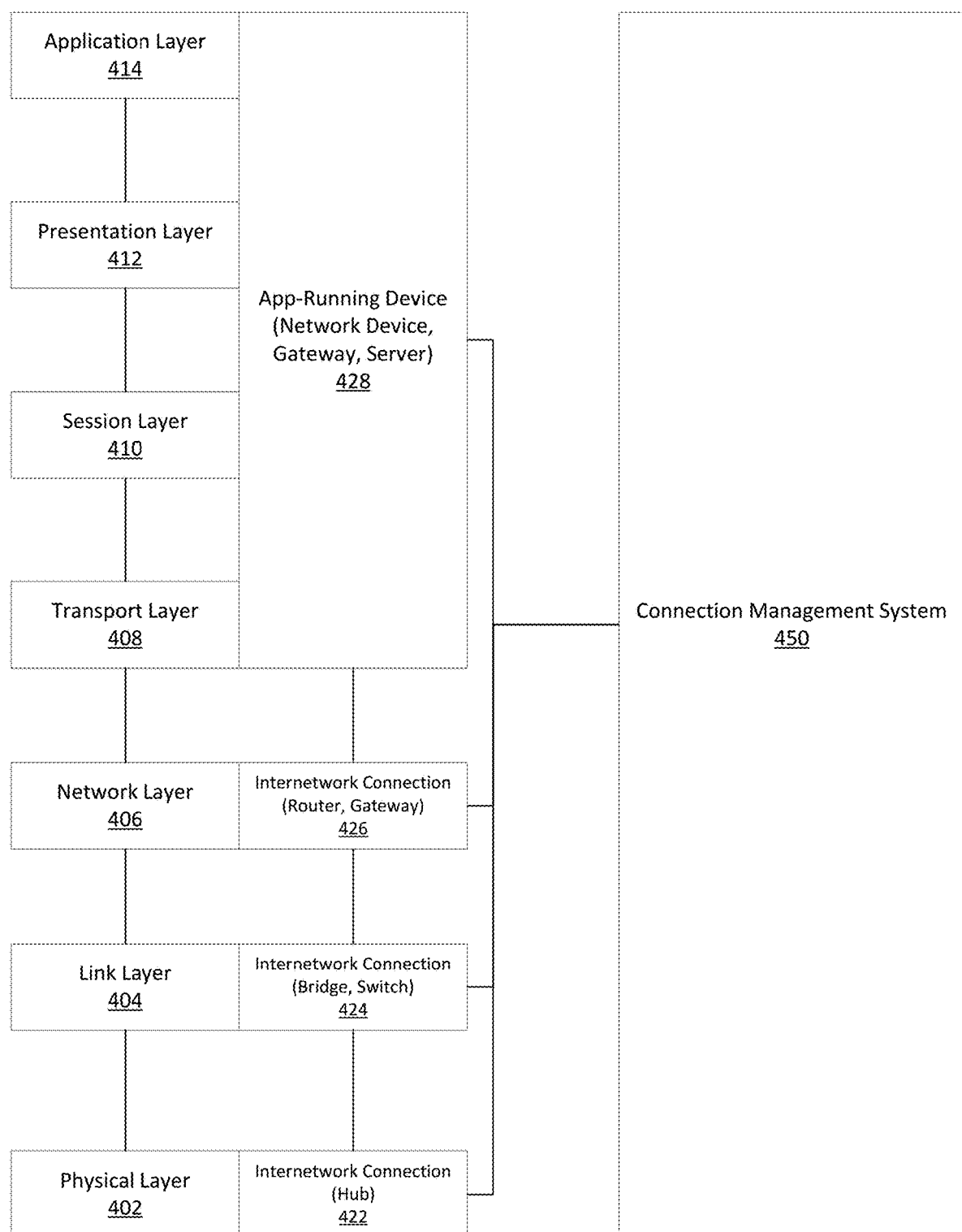
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
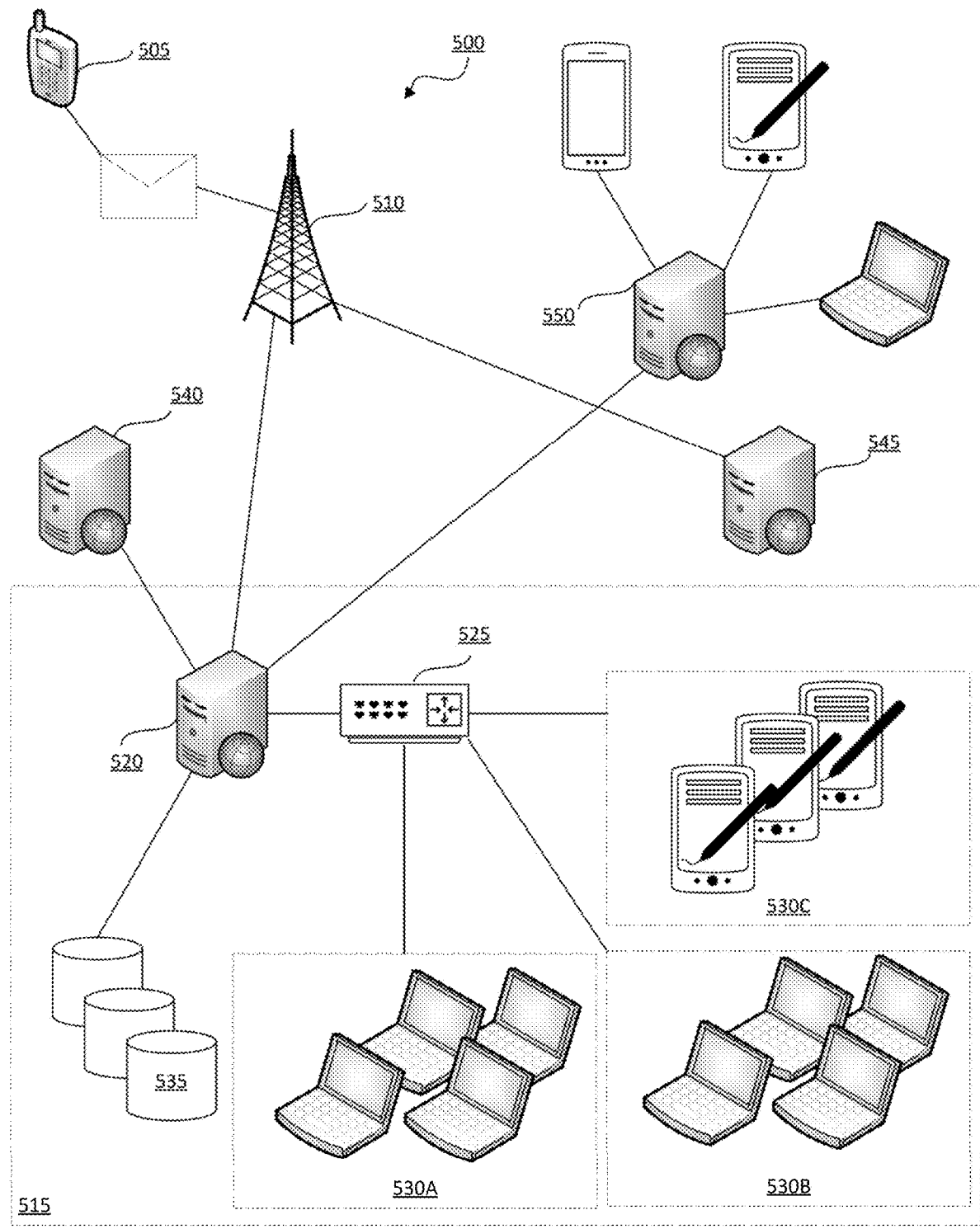
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530*a-c* can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity) at one or more data stores. Such data may influence communication routing.

Notably, various other devices can further be used to influence communication routing and/or processing. For example, in the depicted instance, connection management system 520 also is connected to a web server 540. Thus, connection management system 520 can retrieve data of interest, such as technical item details, and so on.

Network device 505 may also be connected to a web server (e.g., including a web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) behavior of a given user or class of users.

Figure 6:
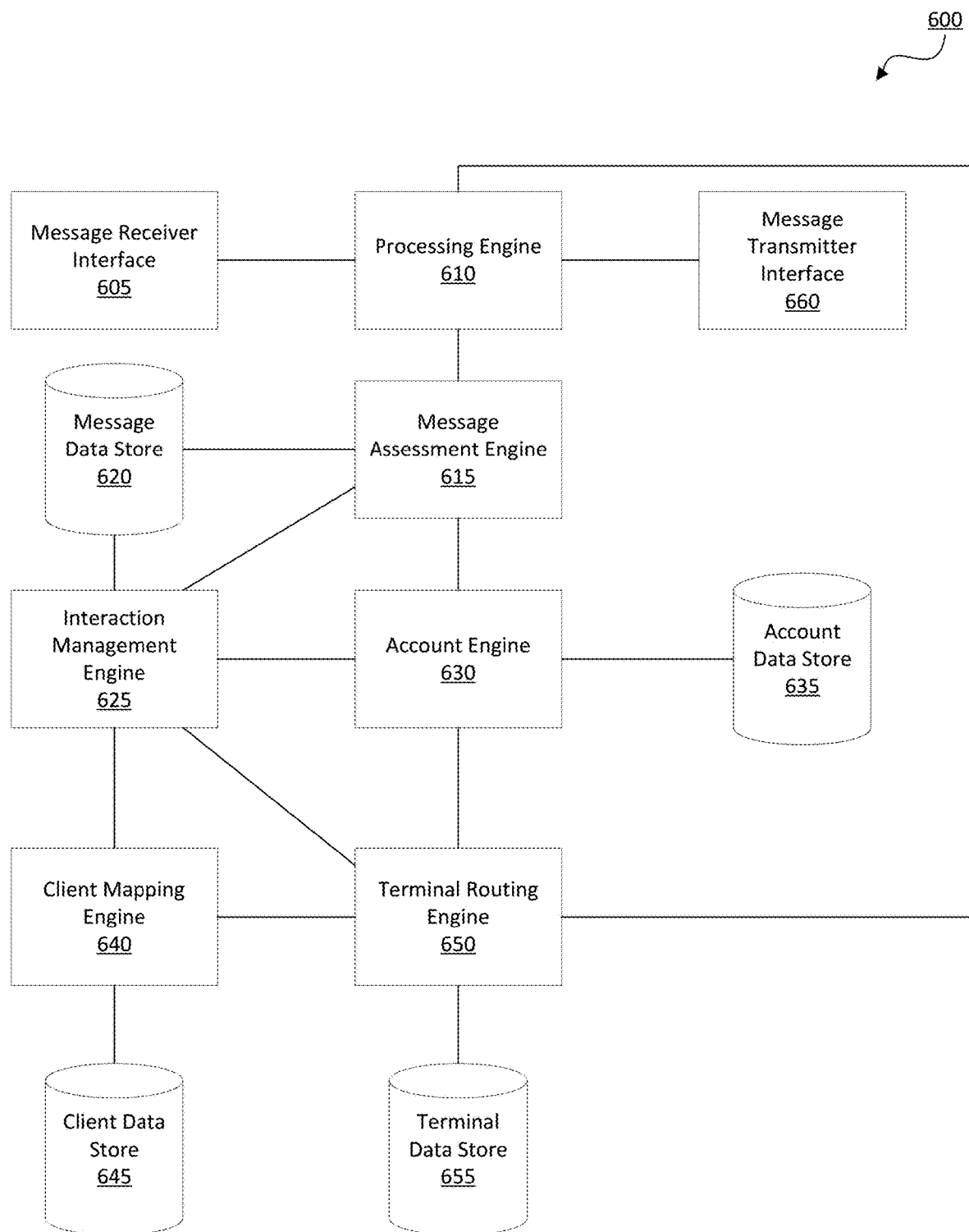
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a same user or profile) has previously communicated with a given terminal device, communication routing can be generally biased towards the same terminal device. Other factors that may influence routing can include, for example, whether the terminal device (or corresponding agent) is available and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device, a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client). In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters.

With regard to determining how devices are to communicate, interaction management engine 625 can (for example) determine whether a terminal device is to respond to a communication via (for example) SMS message, voice call, video communication, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series. In some instances, a representation of a continuous channel (e.g., identifying an agent) can be included in a presentation to be presented on a network device. In this manner, a user can understand that communications are to be consistently routed so as to promote efficiency.

In one instance, a parameter can be generated using one or more factors described herein and a rule (e.g., that includes a weight for each of the one or more factors) to determine a connection parameter corresponding to a given network device and terminal device. The parameter may pertain to an overall match or one specific to a given communication or communication series. Thus, for example, the parameter may reflect a degree to which a given terminal device is predicted to be suited to respond to a network-device communication. In some instances, a parameter analysis can be used to identify each of a terminal device to route a given communication to and whether to establish, use or terminate a connection channel. When a parameter analysis is used to both address a routing decision and a channel decision, a parameter relevant to each decision may be determined in a same, similar or different manner.

Thus, for example, it will be appreciated that different factors may be considered depending on whether the parameter is to predict a strength of a long-term match versus one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a match between a given network device and a different terminal device.

To illustrate, a set of three terminal devices associated with a client may be evaluated for potential communication routing. A parameter may be generated for each that relates to a match for the particular communication. Each of the first two terminal devices may have previously communicated with a network device having transmitted the communication. An input from the network device may have indicated positive feedback associated with an interaction with the communication(s) with the first device. Thus, a past-interact sub-parameter (as calculated according to a rule) for the first, second and third devices may be 10, 5, and 0, respectively. (Negative feedback inputs may result in negative sub-parameters.) It may be determined that only the third terminal device is available. It may be predicted that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on.

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Systems and methods for dynamically switching between bots and terminal devices (e.g., operated by live agents) during communication sessions with network devices (e.g., operated by users) is provided. In some implementations, bots can be configured to autonomously communicate with network devices. Further, bots can be configured for a specific capability. Examples of capabilities can include updating database records, providing updates to users, providing additional data about the user to agents, determining a user's intent and routing the user to a destination system based on the intent, predicting or suggesting responses to agents communicating with users, escalating communication sessions to include one or more additional bots or agents, and other suitable capabilities. In some implementations, while a bot is communicating with a network device (e.g., operated by the user) during a communication session (e.g., using a chat-enabled interface), a communication server can automatically and dynamically determine to switch the bot with a terminal device. For example, bots can communicate with users about certain tasks (e.g., updating a database record associated with a user), whereas, terminal devices can communicate with users about more difficult tasks (e.g., communicating using a communication channel to solve a technical issue).

In some implementations, determining whether to switch between a bot and a terminal device during a communication session can be based on an analysis of one or more characteristics of the messages in a communication session. Further, a dynamic sentiment parameter can be generated to represent a sentiment of messages, conversations, entities, agents, and so on. For example, in cases where the dynamic sentiment parameter indicates that the user is frustrated with the bot, the system can automatically switch the bot with a terminal device so that a live agent can communicate with the user. See U.S. Ser. No. 15/171,525, filed Jun. 2, 2016, the disclosure of which is incorporated by reference herein in its entirety for all purposes. In some examples, determining whether to switch between the bots and terminal devices can be performed without a prompt from a user. The determination can be performed automatically at the communication server based any number of factors, including characteristics of the current messages in the communication session (e.g., chat), characteristics of previous messages transmitted by the user in previous communication sessions, a trajectory of a characteristic (e.g., a sentiment) over multiple messages in a conversation, or additional information associated with the user (e.g., profile information, preference information, and other suitable information associated with the user).

Figure 7:
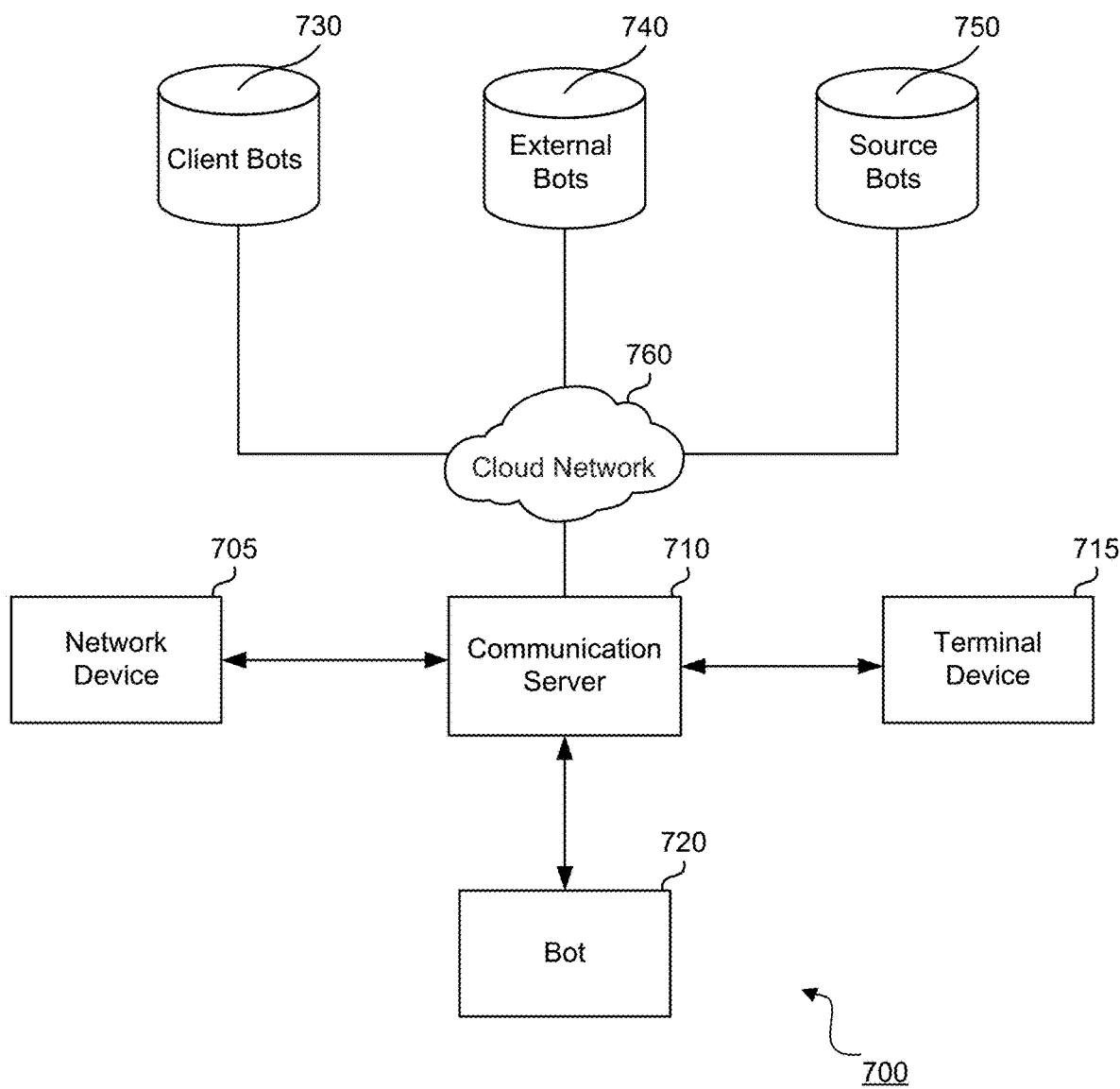
FIG. 7 shows a block diagram of a network environment for dynamically switching between bots and terminal devices during communication sessions.

FIG. 7 shows a block diagram of a network environment for dynamically switching between bots and terminal devices during communication sessions. In some implementations, network environment 700 can include network device 705, communication server 710, terminal device 715, and bot 720. Communication server 710 can be a server with one or more processors with at least one storage device, and can be configured to perform methods and techniques described herein. For example, communication server 710 can manage communication sessions between network devices (e.g., operated by users) and terminal devices (e.g., operated by agents). Communication server 710 can establish a communication channel between network device 705 and terminal device 715 so that network device 705 and terminal device 715 can communicate with each other during a communication session. A communication session can facilitate the exchange of one or more messages between network device 705 and terminal device 715. The present disclosure is not limited to the exchange of messages during a communication session. Other forms of communication can be facilitated by the communication session, for example, video communication (e.g., a video feed) and audio communication (e.g., a Voice-Over-IP connection).

In some implementations, communication server 710 can establish a communication channel between network device 705 and bot 720. Bot 720 can be code that, when executed, is configured to autonomously communicate with network device 705. For example, bot 720 can be a bot that automatically generates messages to initiate conversations with the user associated with network device 705 and/or to automatically respond to messages from network device 705. In addition, communication server 710 can be associated with a platform. Clients (e.g., an external system to the platform) can deploy bots in their internal communication systems using the platform. In some examples, clients can use their own bots in the platform, which enables clients to implement the methods and techniques described herein into their internal communication systems.

In some implementations, bots can be defined by one or more sources. For example, data store 730 can store code representing bots that are defined (e.g., created or coded) by clients of the communication server. For example, a client that has defined its own bots can load the bots to the communication server 710. The bots defined by clients can be stored in client bots data store 730. Data store 740 can store code representing bots that are defined by third-party systems. For example, a third-party system can include an independent software vendor. Data store 750 can store code representing bots that are defined by an entity associated with communication server 710. For example, bots that are coded by the entity can be loaded to or accessible by communication server 710, so that the bots can be executed and autonomously communicate with users. In some implementations, communication server 710 can access bots stored in data store 730, data store 740, and/or data store 750 using cloud network 760. Cloud network 760 may be any network, and can include an open network, such as the Internet, personal area network, local area network (LAN), campus area network (CAN), metropolitan area network (MAN), wide area network (WAN), wireless local area network (WLAN), a private network, such as an intranet, extranet, or other backbone.

In addition, terminal device 715 can be operated by an agent. Terminal device 715 can be any portable (e.g., mobile phone, tablet, laptop) or non-portable device (e.g., electronic kiosk, desktop computer, etc.). In some instances, the agent can access a website using a browser that is running on terminal device 715. For example, the website can include a console or platform that is running on the browser of terminal device 715. The agent can be logged into the platform using the browser. One or more login credentials (e.g., username, password, and the like) can be used to authenticate the agent's identity before allowing the agent to gain access to the console or web applications included in the console. Examples of a console can include a platform that includes one or more APIs (application programming interfaces), a dashboard including one or more functions, a web-hosted application running on a web browser (without the need for downloading plug-ins) that is capable of establishing or joining a communication session, and other suitable interfaces. Further, the console can include one or more web applications or functions that can be executed. The web applications or functions can be executed at the browser, at communication server 710, a local server, a remote server, or other suitable computing device. For example, the web applications, native applications, or functions can enable an agent to communicate with a user, and to view communications between the user and one or more bots.

In some implementations, communication server 710 can be configured to dynamically switch between bot 720 and terminal device 715 during a particular communication session. For example, communication server 710 can facilitate a communication session between network device 705 and bot 720. Bot 720 can be configured to autonomously communicate with network device 705 by exchanging one or more messages with the network device 705 during the communication session. Communication server 710 can dynamically determine whether to switch bot 720 with terminal device 715 (or in some cases, vice versa) so that a live agent can communicate with network device 705, instead of bot 720. In some implementations, the switching can be performed without a prompt from the network device 705 or terminal device 715. For example, the switching can be based on message parameters (e.g., scores representing sentiment of a message or series of messages) of the messages exchanged between the network device 705 and the bot 720, without prompting the network device 705 to request a terminal device.

In some implementations, communication server 710 can determine to switch between bot 720 and terminal device 715 automatically based on characteristics of the messages exchanged between the bot 720 and the network device 705. In some instances, analyzing the text of a message to determine the characteristic (e.g., the message parameter) can include an analysis of textual or non-textual attributes associated with the message. For example, communication server 710 can extract one or more lines of text included in the message from network device 705. Communication server 710 can identify whether the one or more lines of text include an anchor. Examples of an anchor include a string of text associated with a polarity (e.g., sentiment or intent, the word "frustrated" corresponding to a negative polarity or frustrated polarity, the word "happy" corresponding to a positive polarity, and so on). For example, a term "dispute" for one client can be negative, but can be neutral or positive for a second client. In some instances, anchors can be dynamically determined using supervised machine learning techniques. For example, one or more clustering algorithms can be executed on stored messages to find patterns within the stored messages. The clustered messages can be further filtered and evaluated to determine the anchor. Further, one or more words near the identified anchor can be parsed for amplifiers. An example of an amplifier is a term that increases or decreases an intensity associated with the polarity of the anchor, such as "really," "not really," "kind of," and so on. The characteristic can include, for example, the speed of typing, the number of special characters used in the message (e.g., exclamation points, question marks, and so on), a semantic analysis of a message (e.g., by identifying keywords, sentence structures, repeated words, punctuation characters and/or non-article words); user input (e.g., having selected one or more categories); and/or message-associated statistics (e.g., response latency).

As a non-limiting example, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. In a further example, if the term "kind of" is near the anchor "don't like" (e.g., as in the sentence "I kind of don't like"), the term "kind of" may be identified as an amplifier term that indicates a medium intensity of the negative polarity. In this case, a message parameter can be generated based on the identification of the medium intensity of the negative polarity. As a non-limiting example, the message parameter can be a numerical value that indicates the medium intensity of the negative polarity (e.g., a message parameter of 40, as opposed to the message parameter of 20). In some instances, the message parameter can be used to determine which secondary queue is to store the communication.

In some implementations, the characteristic of a message can be the sentiment associated with the message. The message parameter can represent the sentiment of the message. For example, if the sentiment of the message is happy, the message parameter can be a certain value or range of values, whereas, if the sentiment of the message is angry, the message parameter can be another value or range of values. Determining whether to switch between the bots and the terminal device can be based on the message parameter, which is continuously and automatically updated with each new message received at communication server 710.

In some implementations, communication server 710 may recommend or predict responses to messages received from network device 705. For example, communication server 710 can include a message recommendation system, which can evaluate messages received from network device 705 and use a machine-learning model to recommend responses to those received messages. The message recommendation system can display a set of recommended messages on terminal device 715 to assist the agent in communicating with network device 705.

Figure 8:
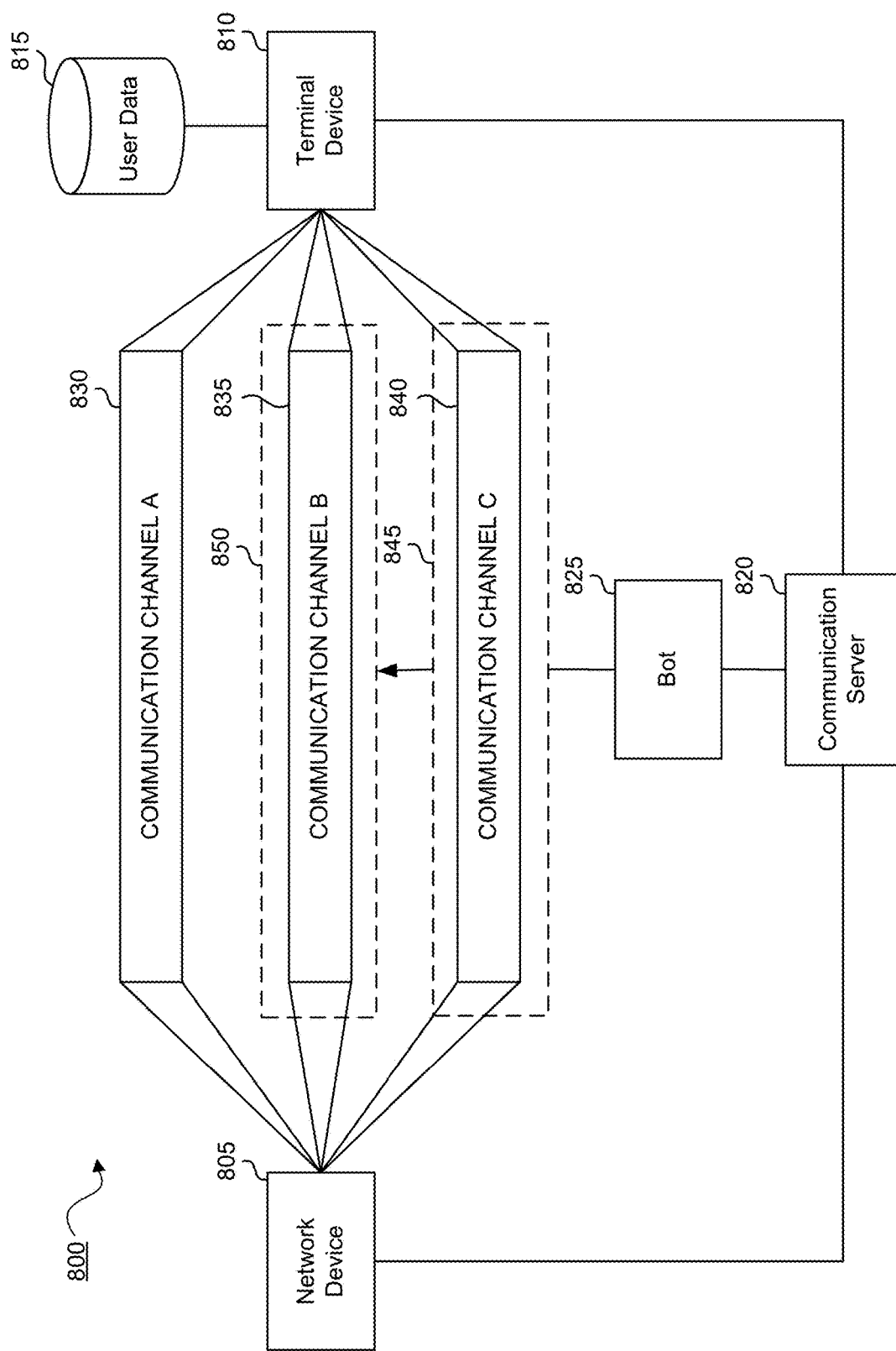
FIG. 8 shows a block diagram representing a network environment for dynamically selecting endpoints across multiple channel environments.

FIG. 8 shows a block diagram representing network environment 800 for dynamically selecting endpoints across multiple communication channels. In some implementations, network environment 800 may include network device 805, terminal device 810, and communication server 820. Network device 805 may be similar to network device 705, and thus, a description is omitted here for the sake of brevity. Terminal device 810 may be similar to terminal device 715, and thus, a description is omitted here for the sake of brevity. Communication server 820 may be similar to Communication server 710, and thus, a description is omitted here for the sake of brevity.

Communication server 820 may establish or facilitate the establishment of a communication channel between network device 805 and terminal device 810. As illustrated in FIG. 8, communication server 820 may establish communication channel C 840, which enables network device 805 and terminal device 810 to exchange one or more messages. As a non-limiting example, communication channel C 840 may be a web chat feature of a website, communication channel B 835 may be a chat application running on a mobile device (e.g., a smart phone), and communication channel A 830 may be a voice over Internet Protocol (VOIP) audio channel that enables the agent to communicate with the user.

Communication server 820 may configure bot 825 to autonomously communicate with network device 805. In some implementations, bot 825 may access and execute one or more protocols that enable bot 825 to communicate with network device 805 using communication channel C 840. Continuing with the non-limiting example above, bot 825 may access and execute a protocol for communicating over the web chat feature of the website. In this example, the protocol may include a coding language specific to the web chat feature for exchanging messages using the web chat feature. The protocol may include code that, when executed, converts a message (e.g., a string of text or other content) inputted by an agent at terminal device 810 into structured content (e.g., content separated into independent data fields), and maps the structured content to elements of the web chat feature of the website. As input is received at terminal device 810 (e.g., by the agent), bot 825 can translate the structured content to the elements of the web chat feature to enable the message to be communicated using the web chat feature.

In some implementations, bot 825 can also be configured to communicate with network device 805 using communication channel B 835. Communication channel B 835 can be a different communication channel from communication channel C 840. Further, communication channel B 835 may require different elements to facilitate communication than the elements required for communication channel C 840. Bot 825 can be configured to translate the structured content to the elements of communication channel B 835. Continuing with the non-limiting example described above, communication channel B 835 may be an in-app chat feature of a native application running on a smart phone. One or more elements may be required in order to facilitate communication using communication channel B 835. For example, FACEBOOK MESSENGER may be the native application running on the smart phone. In this example, the one or more elements of FACEBOOK MESSENGER may be templates specific to FACEBOOK MESSENGER that are required to facilitate communication using FACEBOOK MESSENGER. The protocol that enables bot 825 to communicate using communication channel B 835 may map the structured content to the templates of the FACEBOOK MESSENGER native application in order to transmit the structured content as a message within the FACEBOOK MESSENGER application.

In some examples, a mobile application (e.g., a mobile native application) may include executable code (stored in the mobile device or at one or more external servers) that can be executed using the operating system of the network device (e.g., a smartphone). In some examples, the mobile application may include a hybrid mobile application that is comprised of native user interface (UI) components (generated and stored at the mobile device), but is written in an interpreted language (e.g., using Web-based coding languages). The present disclosure is not limited to mobile native applications or hybrid applications, and thus, any type of mobile application may be used in the methods described herein.

In some implementations, bot 825 can also be configured to communicate with network device 805 using communication channel A 830. Communication channel A 835 can be a different communication channel from communication channel C 840 and communication channel B 835. Further, communication channel A 830 may require different elements to facilitate communication than the elements required for communication channel C 840 and for communication channel B 835. Bot 825 can be configured to translate the structured content to the elements of communication channel A 830. Continuing with the non-limiting example described above, communication channel A 830 may be a VOIP audio communication link between network device 805 and terminal device 810. One or more elements may be required in order to facilitate communication using communication channel A 830. The protocol may include a mapping of the structured content to the elements associated with communication channel A 830.

In some implementations, communication server 820 may be configured to dynamically, autonomous, and/or automatically transfer a communication session between different communication channels, so that bot 825 can continuously communicate with network device 805, regardless of the communication channel. For example, network device 805 may be communicating with terminal device 810 using a first communication channel 845 (i.e., communication channel C 840). Network device 805 may transmit a message indicating that the user operating network device 805 intends to change the communication channel currently being used for the communication session. For example, network device 805 may indicate that second communication channel 850 is the target communication channel for continuing the communication session with terminal device 810. Bot 825 can automatically detect the indication that the communication channel should be changed from first communication channel 845 to second communication channel 850. For example, bot 825 may continuously evaluate messages exchanged during the communication session to detect that the communication channel should be changed. Upon detecting the indication that the communication channel should be changed, communication server may identify the user identifier associated with network device 805. For example, user data database 815 may store user identifiers for various users. A user identifier may be a string of text and/or numbers that uniquely identifies a network device. If, at any given time, communication server 820 determines that the same user identifier is associated with two active communication channels, communication server 820 can recognize that the network device is requesting to continue a communication session but to change the communication channels.

Communication server 820 may be configured to support continuity between different communication channels. For example, the target communication channel (e.g., second communication channel 850) can be automatically used by bot 825 to continue the communication session with network device 805, but using second communication channel 850, instead of first communication channel 845. In some implementations, bot 825 may automatically transmit a message to network device 805 using second communication channel 850. Transmitting the message to network device 805 may indicate to network device 805 that the transfer of communication channels is complete. In some implementations, communication server 820 may automatically detect that the communication channel has been changed from first communication channel 845 to second communication channel 850. For example, communication server 820 may recognize the user identifier associated with network device 805 when network device 805 is communicating with bot 825 using first communication channel 845. If network device 805 begins using second communication channel 850 (e.g., without indicating the intention to change communication channels during the communication session), communication server 820 can automatically detect that the user identifier for network device 805 is currently associated with two active communication channels (e.g., first communication channel 845 and second communication channel 850). Communication server 820 can detect that first communication channel 845 is associated with a recent history of messages (e.g., messages transmitted or exchanged within the last five minutes) and that second communication channel 850 is not associated with a recent history of messages (e.g., within the last few minutes). As a result, communication server 820 can determine that network device 805 is requesting to transfer the communication session from first communication channel 845 to second communication channel 850. Communication server 820 can implement the transfer by accessing the protocol associated with second communication channel 850, and executing bot 825 using the accessed protocol to enable bot 825 or terminal device 810 to communicate with network device 805 using second communication channel 850, instead of using first communication channel 845.

In some implementations, one or more machine-learning techniques can be used to identify patterns in the communication channel usage of network device 805. For example, the usage of communication channels by network device 805 can be tracked and recorded (and stored as historical data). Machine-learning techniques can be applied to the historical data to identify which communication channel network device 805 is most likely to use when communicating with a particular entity (e.g., bot, company, terminal device, agent, and so on). When initiating communications from terminal device 810 (or bot 825 or any other terminal device) to network device 805, communication server 820 can establish a communication channel of the type that network device 805 is most likely to use (based on the results of the machine learning techniques). As network device 805 begins to use a different communication channel more frequently, communication server 820 can identify this changing trend and initiate communication sessions using the most used or most frequently used communication channel.

Figure 9:
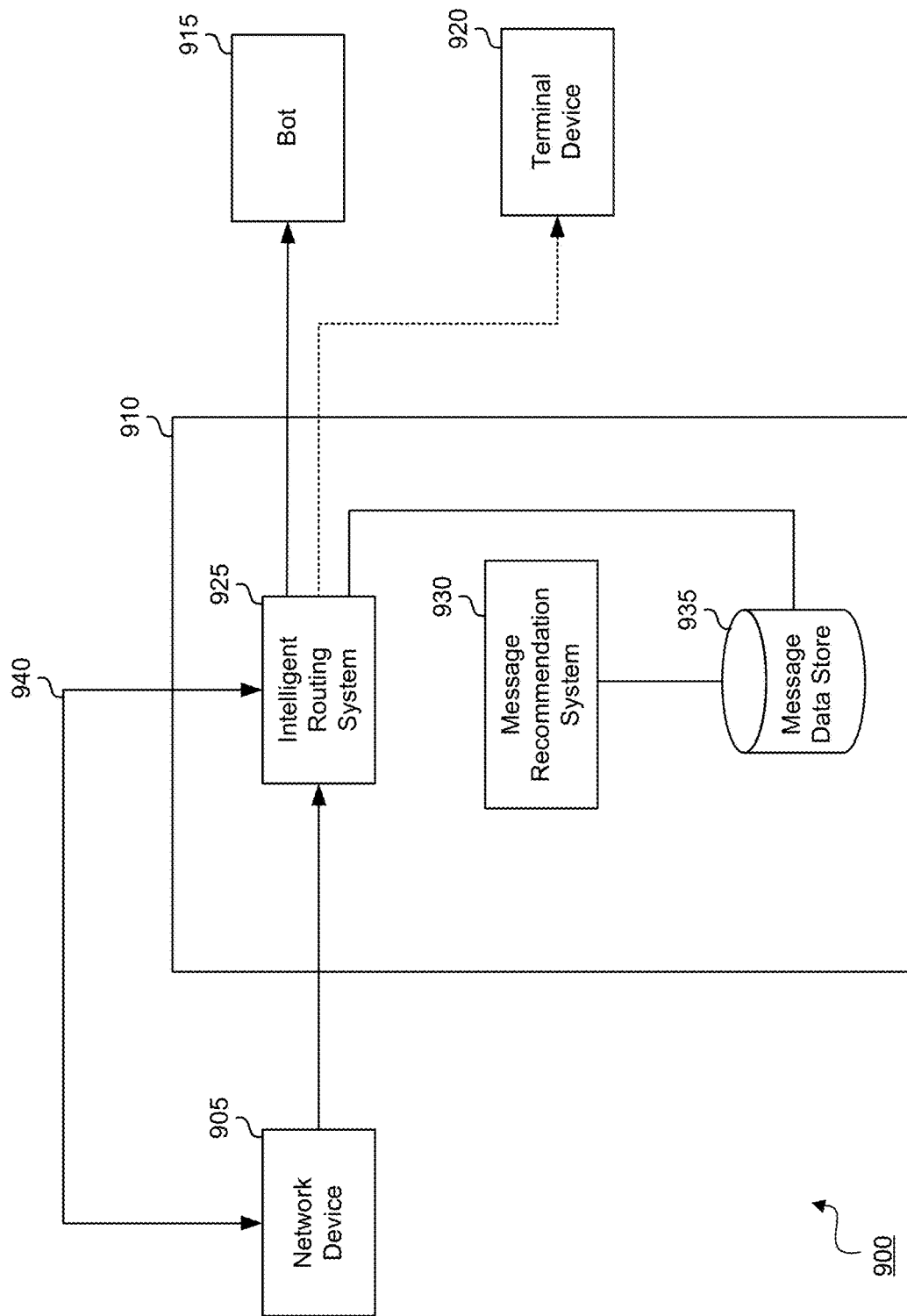
FIG. 9 shows a block diagram representing a network environment for enhancing endpoint selection using machine-learning techniques.

FIG. 9 shows a block diagram representing network environment 900 for enhancing endpoint selection using machine-learning techniques. Network environment 900 may include network device 905 (operated by a user) communication server 910, bot 915 and terminal device 920. Communication server 910 can facilitate the establishment of a communication channel that enables network device 905 and at least one bot 915 and terminal device 920 to communication.

Communication server 910 may include intelligent routing system 925, message recommendation system 930, and message data store 935. Each of intelligent routing system 925 and message recommendation system 930 may include one or more computing devices with a processor and a memory that execute instructions to implement certain operations. In some implementations, intelligent routing system 925 may be a bot configured to intelligently route communications received from network devices to the appropriate destination. Intelligent routing system 925 may include one or more processors configured to execute code that causes one or more machine-learning techniques or artificial intelligence techniques to intelligently route messages. In some implementations, intelligent routing system 925 can execute one or more machine-learning techniques to train a model that predicts a destination associated with a message received from network device 905.

As a non-limiting example, intelligent routing system 925 may receive a message from network device 905 through a communication channel established or facilitated by communication server 910 (e.g., a native application configured to enable users to communicate with each other across various devices). Intelligent routing system 925 may evaluate the incoming message according to certain embodiments described above. For example, intelligent routing system 925 may evaluate the content (e.g., text, audio clips, images, emoticons, or other suitable content) included in the received message using a trained machine-learning model. The content of the message can be inputted into the machine-learning model to generate a predicted destination (e.g., a particular terminal device or bot). The machine-learning model may be continuously trained based on feedback signal 940 received from network device 905. In some implementations, intelligent routing system 925 may request an acknowledgement from network device 905 of the predicted destination. As a non-limiting example, intelligent routing system 925 may evaluate the message using a machine-learning technique, and a result of the evaluation may include a predication that bot 915 is the destination for the message. To confirm, intelligent routing system 925 may automatically request feedback signal 940. For example, feedback signal 940 may include a request for network device 905 to acknowledge whether bot 915 is the correct destination for the message (e.g., "Is Technical Support the correct destination?"). If network device 905 transmits the acknowledgement that bot 915 is the correct destination (e.g., the destination intended by the user operating network device 905), then intelligent routing system 925 may train the machine-learning model to predict that future messages including the exact or similar content (e.g., a threshold of similarity, such as 10 percent difference in content) as the received message are to be routed to bot 915. However, if intelligent routing system 925 receives feedback signal 940 indicating that bot 915 is not the correct or intended destination for the received message, but rather terminal device 920 was the correct or intended destination, intelligent routing system 925 can train the machine-learning model that future messages including the exact or similar content as the received message are to be routed to terminal device 920 (instead of bot 915). In some implementations, intelligent routing system 925 may not immediately update or train the machine-learning model to route future messages to terminal device 920, but rather, intelligent routing system 925 may wait for a threshold number of incorrect routings to bot 915 before routing all future messages with the exact same or similar content as the received message to terminal device 920. As a non-limiting example, intelligent routing system 925 may begin routing future messages (that were predicted to be routed to bot 915) to terminal device 920 instead of bot 915 after five instances of network devices transmitting feedback signals indicating that bot 915 is not the correct or intended destination.

In some embodiments, intelligent routing system 925 may select where to route a given message based on bids received to handle a particular request in the message. Intelligent routing system 925 may broadcast an intent to disparate services and determine who wants to bid on handling the request. Bidding parties may respond with their level of confidence in successfully handling the request and a plan to execute handling of the request. Intelligent routing system 925 may evaluate all of the responses from the bidding parties and, based on machine learning policies, determine which bidding party to use for a given message.

Message data store 935 may store some (e.g., but not all) or all messages received in the past from one or more network devices. Further, message data store 935 may also store some or all messages transmitted by terminal devices or bots during previous communication sessions with network devices. Message data store 935 may also store some or all messages transmitted by network devices to bots during communication sessions. Further, message data store 935 may store some or all messages transmitted by bots to network devices during communication sessions. In some implementations, message data store 935 may be a database of all messages processed (e.g., transmitted by or received at) communication server 910.

Message recommendation system 930 may analyze the database of messages stored at message data store 935. In some implementations, message recommendation system 930 may evaluate the messages stored at message data store 935 using one or more machine-learning algorithms or artificial intelligence algorithms. For example, message recommendation system 930 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 935. In some implementations, a recurrent neural network (RNN) or a convolutional neural network (CNN) may be used to predict response messages to assist the agent. In some implementations, message recommendation system 930 may use support vector machines (SVM), supervised, semi-supervised, ensemble techniques, or unsupervised machine-learning techniques to evaluate all previous messages to predict responses to incoming messages received from network devices during communication sessions. For example, message recommendation system 930 may evaluate the content of messages received from network devices (or messages received at communication server 910 from bots or terminal devices) and compare the results of the evaluation to the one or more clusters of previous messages stored in message data store 935. Once the cluster is identified, message recommendation system 930 can identify the most relevant response messages based on a confidence threshold. For example, an incoming message (e.g., received at communication server 910 from network device 905) may correspond to a technical issue based on the content of the incoming message. Message recommendation system 930 can identify that the incoming message corresponds to a technical issue based on an evaluation of the content of the incoming message (e.g., text evaluation). Message recommendation system 930 can access message data store 935 to identify the cluster of messages associated with technical issues. Message recommendation system 930 can select one or more responses messages within the cluster of messages based on a confidence threshold. As a non-limiting example, a confidence algorithm can be executed to generate a confidence score. A confidence score may be a percentage value where the lower the percentage, the less likely the response is a good prediction for the incoming message, and the higher the percentage, the more likely the response is a good prediction for the incoming message. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms.

Figure 10:
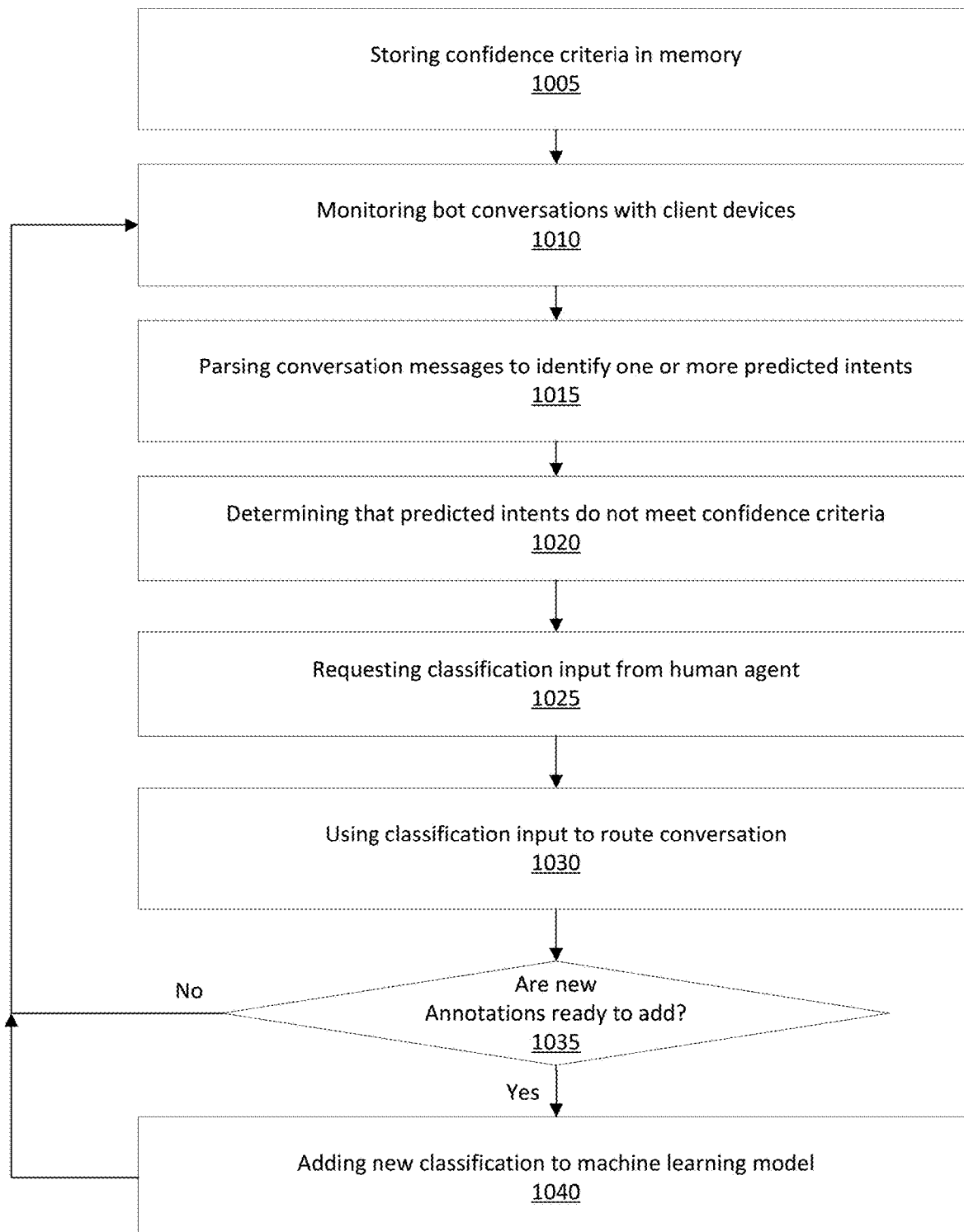
FIG. 10 shows an example process for supervising bot operation and training.

FIG. 10 shows an example process for supervising bot operation and training. In the illustrated method, certain criteria may be defined and stored in memory. Such criteria may be applicable to conversations conducted between a bot (or set of bots) and customers. When a conversation is identified as failing to meet the criteria, the conversation is escalated to an agent device associated with a human agent. For example, the bot may make a prediction regarding a specific intent of the customer (e.g., purchasing or returning a specific product, need to update an address, password, or other user information). The agent may review the conversation and provide input that may classify or re-classify the conversation. The conversation may be handed back to the bot to continue conducting in view of the classification input. In addition, the classification input may be used to update a learning model associated with the bot, and such updated learning model may be used to conduct subsequent conversations.

In step 1005, a set of supervision criteria may be stored in memory regarding the set of supervision criteria including a threshold level of confidence. Such stored criteria define factors (and levels thereof) that may be measured and considered in making the decision to escalate a conversation that is currently being conducted with a bot. The set of supervision criteria may specify one or more conditions, for example, used to determine the threshold level of confidence. The specified conditions may be detected within the conversation, as well as counted, measured, or otherwise evaluated and compared to the threshold of confidence. Different aspects of a messages or sets of messages within a conversation may be evaluated against the stored criteria. In some embodiments, different sets of criteria may be applied to different bots, departments, geographic locations, and systems. Such criteria may also be customized to specific business entities or industries.

In step 1010, one or more messages in a conversation between a bot and a user of a client device may be monitored and evaluated against the set of supervision criteria stored in step 1005. Such monitoring may occur for specific bots, specific groups of bots, specific departments, or throughout the system. The designation of what to monitored may be customized to different entities or businesses, as well as customized to the associated set of agents. Messages associated with a new type of bot, for example, may be designated for monitoring.

In step 1015, the monitored messages may be further passed to predict one or more intents regarding the customer's specific needs. For example, certain conversations cues may indicate an intent associated with product information, purchase, and updating user information. Such intents may drive the bot's coordination of the conversation and result, for example, in routing the conversations to bots respectively tasked with providing product information, purchase orders, and processing updated user information.

Each prediction regarding user intent may be scored (e.g., a confidence score) based on the stored criteria, and that score may be compared to the threshold level of confidence. In some instances, one or more of the bot predictions regarding user intent may meet at least a set threshold level of confidence, and the bot may proceed with conducting the conversation in a manner that meets the customer's needs without requiring intervention. In step 1020, a predicted intent for particular conversation may fail to at least meet the threshold level of confidence. For example, a particular intent prediction by the bot may fail to meet the threshold level of confidence when a confidence score assigned to that intent prediction is compared to the threshold level of confidence and found not to meet that threshold level of confidence.

In step 1025, a request for input may be sent to an agent device, which may respond by providing classification input regarding the conversation. When the conversation is flagged as failing to meet the threshold level of confidence, such failure may indicate that that there may be a need to escalate the conversation to an agent in order to maintain certain levels of customer satisfaction. As such, agent intervention may be requested. Rather than hand off the task of conducting the identified conversation completely to the agent, the request may specifically request input regarding a specific intent prediction that does not meet the threshold level of confidence (e.g., from among one or more other identified intent predictions that do meet the threshold level of confidence). In an exemplary embodiment, the request may present at least a portion of the conversation associated with the specific intent prediction that failed to meet the threshold level of confidence. Some embodiments may further present a set of options associated with the request for input. Such options may be associated with the different types of bots (or other parameter of the conversation needed to refine the intent prediction.

In step 1030, the input from the agent device may be provided to the bot, which may use such input to classify and route the conversation to one or more endpoint devices (e.g., other bots or agents). Such classification and routing may be the same or differ from the identified prediction that failed to meet the threshold level of confidence. Where the classification input allows for a better intent prediction regarding purchase intent, for example, the conversation may be handed off to a bot designed to intake purchase orders. In some instances, the routing and handoff of the conversation to the one or more endpoints may occur in real-time as the conversation is on-going. For example, the bot may continue asking follow up questions regarding one or more potential intents even as the conversation has been escalated to the agent device.

In step 1035, it may be determined whether any new annotations may be ready to add to a learning model associated with the bot. If not, the method may return to step 1010 in which more conversations continue to be monitored.

If there are annotations ready to add to the learning model, the method may proceed to step 1040. In addition to facilitating bot operations in relation to the current conversation satisfactorily, the classification input from the agent device may also be saved and tracked in the learning model for use by the same bot, same type of bots, and/or other system bots in future conversations. Such classification input may serve, for example, as annotations to the conversation. In some instances, the learning model may be updated based on a single annotated conversation or based on multiple conversations together that have been annotated in the same or similar ways in accordance with the same or similar classification input.

In step 1040, the new classification input may be added to the learning model for use in future conversations. A bot conducting similar conversations in the future, for example, may no longer make predictions that fail to meet the threshold level of confidence. As such, similar conversations in the future are therefore not escalated to the agent device. Instead, the bot may use the learning model (now updated based on the classification input from the agent device) in real-time when conducting the next conversation to reach an intent prediction (e.g., in accordance with the intent prediction or routing decision of step 1030. Such intent prediction may further be assigned a classification score that at least meets the threshold level of confidence.

Figure 11:
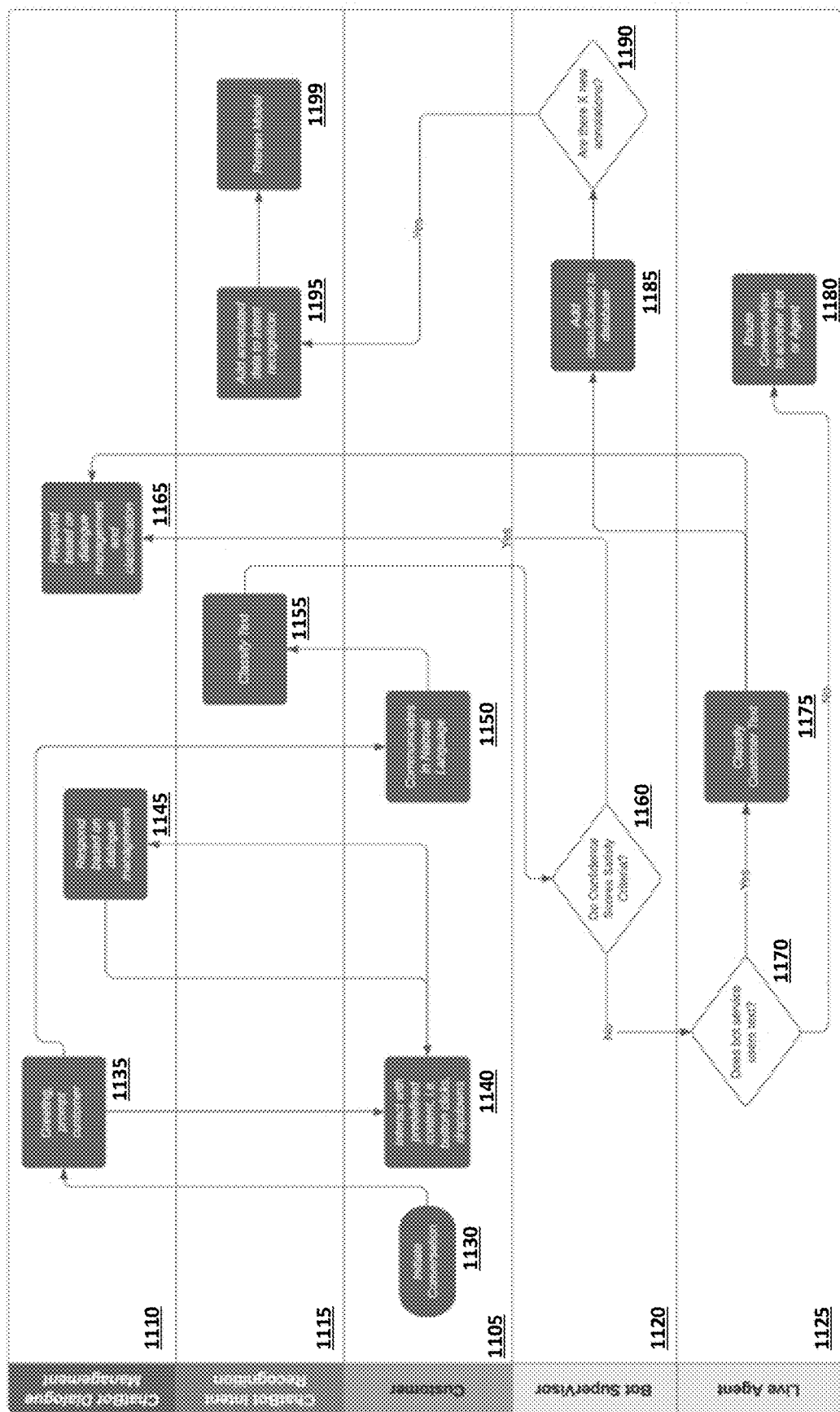
FIG. 11 shows a block diagram representing a network environment in which a system for supervising bot operation and training may be implemented.

FIG. 11 shows a block diagram representing a network environment in which a system for supervising bot operation and training may be implemented. As illustrated, the network environment may be categorized by operations respectively associated with customer devices 1105, bot dialogue management 1110, bot intent recognition 1115, bot supervision 1120, and agent devices 1125. Thus, a conversation may involve and be routed among a plurality of different devices and systems based on real-time analyses of incoming communications.

Bot dialogue management operations may include functions involved in communicating with customers via any mode known in the art, including telephonic, textual (e.g., SMS, MIMS, instant message), graphic, etc. Such dialogue management operations may include greeting customers, asking questions or providing prompts for specific customer information, and generating responses to the customers. Response generation may be based on learning models for dialogue management, as well as based on input (e.g., from agent devices) relating to dialogue management and classification. Data regarding conversations may be tracked on an ongoing basis in real-time and stored in conjunction with historical data. The historical and real-time data may also be incorporated into the learning models, which are thereby dynamically updated in view of the same. Such updates to the learning models may further result in dynamic adjustment to predictions and recommendations made for similar conversations over time. Different learning models may also be customized to different entities (e.g., companies, brands) operating the bots, different customers, and categories of the same.

The intent recognition operations may include text classification, dialogue annotation in relation to intent recognition, and training intent-related models. Meanwhile, the customer may be prompted for such information as may initiate a conversation, interaction with predefined contexts (e.g., buttons, drop-down menus), and natural language communications. As noted above, such information may be provided through a variety of different types of communication channels. Regardless of channel, such customer input may be parsed, analyzed, and used to perform operations related to bot dialogue management 1110, intent recognition 1115, and bot supervision 1120 in real-time.

In step 1130, a customer device 1105 may initiate a conversation within a communication system. The customer device 1105 may initiate a conversation through any of the channels discussed above. Such initiation may be made expressly (e.g., request or selection of an option) or implicitly (e.g., repeated searches, extended browsing). Based on the initiation, a communication session may be established between customer device 1105 and a chatbot (e.g., chatbot dialogue management system 1110).

In step 1135, chatbot dialogue management system 1110 may respond to initiation of the conversation or establishment of the communication session by transmitting a greeting or other prompt to the customer device. In some implementations, the communication session may be associated with a graphic user interface with which the customer of the customer device 1105 may make selections (e.g., button clicks, from dropdown menus) or interact with predefined content in step 1140. The chatbot dialogue management system 1110 may respond to such selections or interactions based on predetermined dialogue management rules and policies.

In some instance, the customer of the customer device 1105 may enter natural language communications such as in step 1150. Then in step 1155, chatbot intent recognition system 1115 may classify the natural language communications in accordance with one or more learning models. Such learning models may include both historical and real-time data regarding multiple different conversations. The data may include data regarding the specific customer, any chatbot or agent involved, operating entity, keywords and phrases, actual messages exchanged, routing decisions, conversation outcomes, and other contextual data.

In step 1160, it is determined whether confidence scores associated with the classifications satisfy specified criteria or thresholds. If so, the method may proceed to step 1165 in which the chatbot dialogue management system 1110 may respond to the natural language communication based on the classification. If the confidence scores associated with the classifications do not satisfy specified criteria or thresholds, however, the method may proceed to step 1170 in which it is determined whether the chatbot dialogue management system 1110 currently engaged in the conversation is able to service user text. If chatbot dialogue management system 1110 currently engaged in the conversation cannot service user text, the method may proceed to step 1180 in which the conversation is routed to another bot or agent.

Once it is determined that it is determined that the chatbot dialogue management system 1110 currently engaged in the conversation can indeed service user text, the method may proceed to step 1175, in which a live agent using the agent device 1125 is queried in real-time regarding classification of the natural language communication entered by the customer of customer device 1105. Thus, in situations where a natural language communication cannot be categorized by chatbot intent recognition system 1115 at a certain level of confidence (e.g., 80%, 90%), the natural language communication (and related contextual data) may be provided to agent device 1125 for real-time classification.

The classification provided by the live agent of agent device 1125 may be provided to chatbot dialogue management system 1110 as the method reverts to step 1165 for continued conversation. In addition, the classification provided by the live agent of agent device 1125 may also be added to a database for storage in step 1185. The classification from the live agent of agent device 1125 may also be used to update one or more learning models in real-time, such that other ongoing conversations—with similar natural language communication—may be classified at a higher level of confidence than before the update.

In some implementations, the live agent of agent device 1125 may also provide annotations to the natural language communication or other conversational data. Such annotations may provide yet further context and supplemental information for understanding the intent In step 1190, it may be determined whether there were any new annotations associated with the classification. If no, the method may end. If there are any new annotations associated with the classification, the method may proceed to step 1195 in which the annotations are added to data used for intent recognition and classification of natural language communications. Then in step 1199, any learning models reliant on such data may be retrained in real-time based on the classification and associated annotations Bot supervision operations may include the operations described in relation to FIG. 11, including evaluating confidence scores, comparing confidence scores to designated thresholds, and adding new classification input and new annotations to learning model databases. Bot supervision may further operate in conjunction with input from human agents, such may include text classification, which may directly or indirectly be used to provide routing instructions for the current conversation. In addition, such input may be used to update learning models and database, so that the same classification inputs may not be required from human agents for future conversations conducted by bots.

Figure 12:
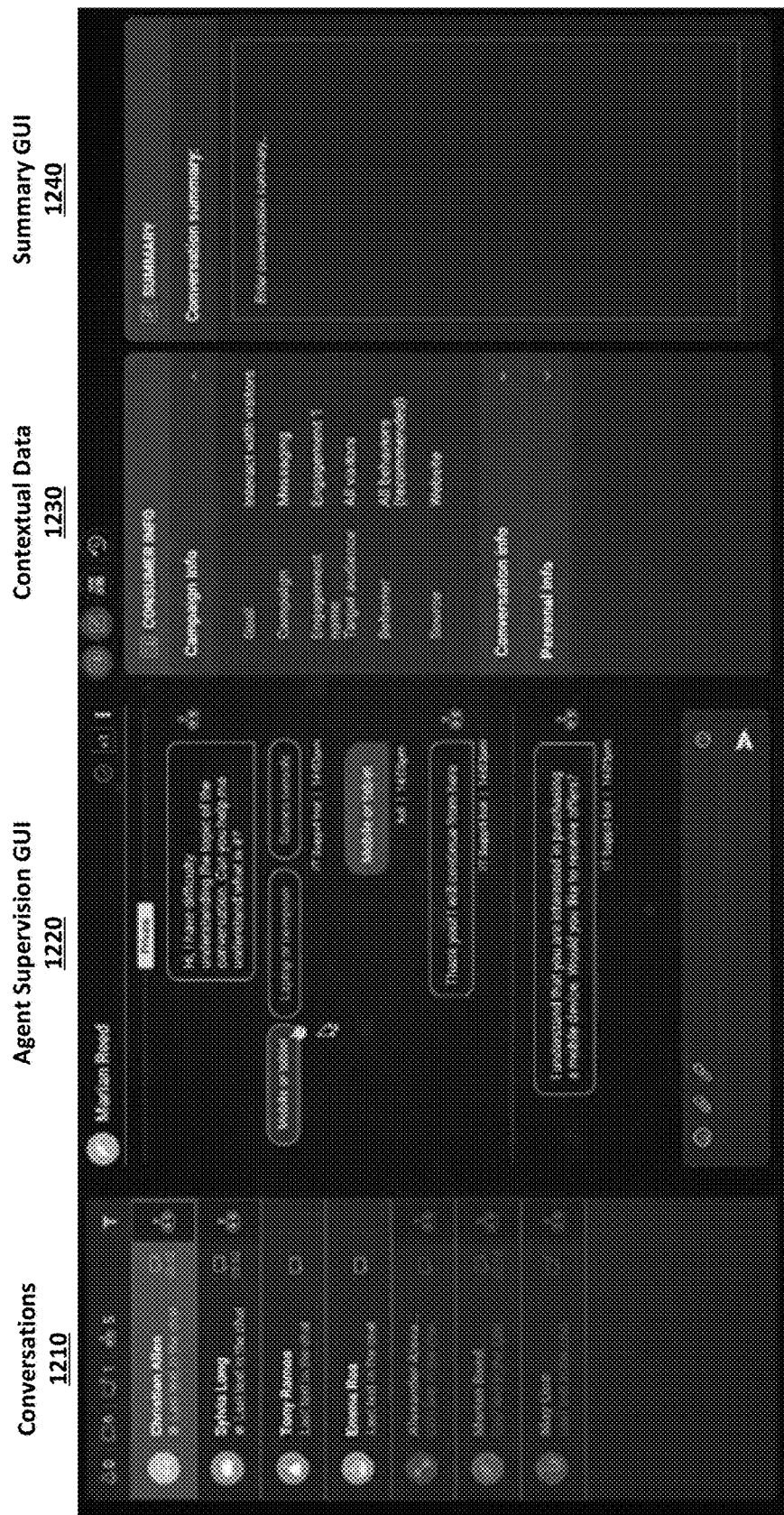
FIG. 12 illustrates an exemplary interface for supervising bot operation and training.

FIG. 12 illustrates an exemplary interface for supervising bot operation and training. Such an interface may be presented on the agent device in response to the request from a bot. As illustrated, such an interface may include several portions: a list of different conversations 1210 (e.g., associated with bot escalations), a detailed view of one particular conversation may be shown (along with routing options) in an agent supervision graphic user interface 1220, detailed information regarding a particular campaign (e.g., business) associated with the conversation 1230, and a summary GUI 1240.

The list of different conversations 1210 may have been routed to an agent device 1125 based on a current natural language communication having a classification that did not meet certain criteria or thresholds. Further, as illustrated in the agent supervision GUI 1220 portion of the interface, the natural language communication may be presented with a set of different options (e.g., corresponding to different classifications). The options may be selectable to classify the natural language communication in real-time, as the classification may be provided to the chatbot dialogue management system 1110 to formulate a response based on the classification and thus continue the conversation. Contextual data 1230 may also be provided in the interface, so that the agent of agent device 1125 may refer to the same in making the classification. Such contextual data may include data regarding a particular campaign, data regarding the specific conversation, or personal data regarding the customer.

When a human agent selects one of the options presented within the agent supervision GUI 1220, such option may thereafter be used to classify an intent prediction associated with the conversation. Summary GUI 1240 portion of the interface may be used to enter annotations associated with the classification. The conversation may further be handed back to the bot to operate in accordance with the selected option for intent prediction. In addition, such selection may be analyzed in the context of similar conversations and used to update an associated learning model used by bot in future conversations. Meanwhile, the classification and annotations may be used to refine learning models for message classification and intent recognition. Such learning models may be applied to ongoing and future conversations, which may thereafter result in different classifications and confidence levels for such classifications.

The disclosed system and methods for bot supervision can be performed using a computing server. An example computing server can include a processor (e.g., a central processing unit), memory, non-volatile memory, and an interface device. The memory may store data and/or one or more code sets, software, scripts, etc. The components of the computer server can be coupled together via a bus or through some other known or convenient device. The processor may be configured to carry out all or part of methods described herein for example by executing code for example stored in memory. One or more of a user device or computer, a provider server or server, or a suspended database update server may include the components of the computing server or variations on such a server.

This disclosure contemplates the computer server taking any suitable physical form, including, but not limited to a Point-of-Sale server ("POS"). As example and not by way of limitation, the computer server may be an embedded computer server, a server-on-chip (SOC), a single-board computer server (SBC) (such as, for example, a computer-on-module (COM) or server-on-module (SOM)), a desktop computer server, a laptop or notebook computer server, an interactive kiosk, a mainframe, a mesh of computer servers, a mobile telephone, a personal digital assistant (PDA), a server, or a combination of two or more of these. Where appropriate, the computer server may include one or more computer servers; be unitary or distributed; span multiple locations; span multiple machines; and/or reside in a cloud, which may include one or more cloud components in one or more networks. Where appropriate, one or more computer servers may perform without substantial spatial or temporal limitation one or more steps of one or more methods described or illustrated herein. As an example and not by way of limitation, one or more computer servers may perform in real time or in batch mode one or more steps of one or more methods described or illustrated herein. One or more computer servers may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed.

The non-volatile memory is optional because servers can be created with all applicable data available in memory. A typical computer server will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer server. The interface can include an analog modem, Integrated Services Digital network (ISDN0 modem, cable modem, token ring interface, satellite transmission interface (e.g., "direct PC"), or other interfaces for coupling a computer server to other computer servers. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer server can be controlled by operating server software that includes a file management server, such as a disk operating server. One example of operating server software with associated file management server software is the family of operating servers known as Windows® from Microsoft Corporation of Redmond, Wash., and their associated file management servers. Another example of operating server software with its associated file management server software is the Linux™ operating server and its associated file management server. The file management server can be stored in the non-volatile memory and/or drive unit and can cause the processor to execute the various acts required by the operating server to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer server, or similar electronic computing device, that manipulates and transforms data represented as physical (electronic) quantities within registers and memories of the computer server into other data similarly represented as physical quantities within the computer server memories or registers or other such information storage, transmission or display devices.

The algorithms and displays presented herein are not inherently related to any particular computer or other apparatus. Various general purpose servers may be used with programs in accordance with the teachings herein, or it may prove convenient to construct more specialized apparatus to perform the methods of some examples. The required structure for a variety of these servers will appear from the description below. In addition, the techniques are not described with reference to any particular programming language, and various examples may thus be implemented using a variety of programming languages.

In various implementations, the server operates as a standalone device or may be connected (e.g., networked) to other servers. In a networked deployment, the server may operate in the capacity of a server or a client server in a client-server network environment, or as a peer server in a peer-to-peer (or distributed) network environment.

The server may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any server capable of executing a set of instructions (sequential or otherwise) that specify actions to be taken by that server.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the server and that cause the server to perform any one or more of the methodologies or modules of disclosed herein.

In general, the routines executed to implement the implementations of the disclosure, may be implemented as part of an operating server or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer servers, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a server, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ servers having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other servers, not necessarily the server described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the servers, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the server may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer server bus. Furthermore, any computing servers referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of servers and components for a contextual connection server. It will be understood by one of ordinary skill in the art, however, that the implementations described above may be practiced without these specific details. For example, circuits, servers, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing servers that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback server, a printer, and/or other types of output devices. A data storage device, such as a hard drive or flash memory, can enable the computing device to temporarily or permanently store data. A network interface, such as a wireless or wired interface, can enable the computing device to communicate with a network Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall server. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update server.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Thus, particular embodiments of the invention have been described. Other embodiments are within the scope of the following claims. For example, the actions recited in the claims can be performed in a different order and still achieve desirable results.

What is claimed is:
1. A computer-implemented method comprising:
storing a set of supervision criteria in memory, the set of supervision criteria including a threshold level of confidence;

monitoring one or more messages in a conversation between a bot and a user of a client device in accordance with the set of supervision criteria;

detecting that a bot prediction associated with the conversation fails to meet the threshold level of confidence associated with the set of supervision criteria;

requesting input from an agent device, wherein the agent device provides classification input regarding the conversation;

handing the conversation back to the bot to continue operation in accordance with the classification input, wherein the continued bot operation includes routing the conversation to one or more endpoint devices in accordance with the classification input; and updating a learning model based on the classification input, wherein the bot uses the updated learning model to make a next bot prediction.

2. The computer-implemented method of claim 1, wherein detecting that the bot prediction fails to meet the threshold level of confidence comprises:

assigning a confidence score to the bot prediction; and
comparing the assigned confidence score to the threshold level of confidence.

3. The computer-implemented method of claim 1, wherein routing the conversation to the one or more endpoints occurs in real-time.

4. The computer-implemented method of claim 1, further comprising:

receiving input corresponding to one or more annotations, wherein the one or more annotations provide contextual or supplemental information related to one or more of the messages; and annotating the one or more messages in the conversation based on the contextual or supplemental information provided by the annotations.

5. The computer-implemented method of claim 1, wherein the learning model is updated based on one or more annotated messages.

6. The computer-implemented method of claim 1, further comprising:

providing contextual data associated with the classification input.

7. The computer-implemented method of claim 1, wherein the classification input corresponds to a different prediction than the bot prediction, and wherein the bot routes the conversation by using the classification input in lieu of the bot prediction that failed to meet the threshold level of confidence.

8. The computer-implemented method of claim 1, wherein the next bot prediction corresponds to routing a subsequent conversation by:

making the next prediction based on the updated learning model, wherein the prediction meets the threshold level of confidence; and routing the subsequent conversation to one or more endpoints based on the next prediction.

9. The computer-implemented method of claim 1, wherein requesting the input includes presenting the prediction within a set of prediction options to the agent device, and wherein sets of prediction options correspond to different routing options.

10. The computer-implemented method of claim 1, wherein updating the learning model is further based on one or more other conversations associated with other classification inputs that correspond to the classification input.

11. The computer-implemented method of claim 1, wherein the classification input further includes one or more selections of content from the messages in the conversation.

12. The computer-implemented method of claim 1, wherein the set of supervision criteria further specifies one or more customized conditions to monitor in conversations involving one or more specified entities including at least one of the bot or an agent of the agent device, and further comprising:

setting the threshold level of confidence based on conditions of the conversation corresponding to the customized conditions specified by the supervision criteria.

13. A system comprising:

memory that stores a set of supervision criteria in memory, the set of supervision criteria including a threshold level of confidence;

a communication interface that receives data over a communication network, the received data regarding one or more messages in a monitored conversation between a bot and a user of a client device in accordance with the set of supervision criteria;

one or more processors; and one or more non-transitory machine-readable storage media containing instructions executable by the one or more processors to perform operations including:

detecting that a bot prediction associated with the conversation fails to meet the threshold level of confidence associated with the set of supervision criteria;

requesting input regarding the conversation from an agent device, wherein the agent device provides classification input regarding the conversation;

handing the conversation back to the bot to continue operation in accordance with the classification input, wherein the continued bot operation includes routing the conversation to one or more endpoint devices in accordance with the classification input; and updating a learning model based on the classification input, wherein the bot uses the updated learning model to make a next bot prediction.

14. The system of claim 13, wherein the processors detect that the bot prediction fails to meet the threshold level of confidence by:

assigning a confidence score to the bot prediction; and
comparing the assigned confidence score to the threshold level of confidence.

15. The system of claim 13, wherein the routing of the conversation to the one or more endpoints occurs in real-time.

16. The system of claim 13, further comprising instructions executable by the processors to receive input corresponding to one or more annotations, wherein the one or more annotations provide contextual or supplemental information related to one or more of the messages; and annotate the one or more messages in the conversation based on the contextual or supplemental information provided by the annotations.

17. The system of claim 13, wherein the learning model is updated based on one or more annotated messages.

18. The system of claim 13, wherein the processors execute further instructions to provide contextual data associated with the classification input.

19. The system of claim 13, wherein the classification input corresponds to a different prediction than the bot prediction, and wherein the bot routes the conversation by using the classification input in lieu of the bot prediction that failed to meet the threshold level of confidence.

20. The system of claim 13, wherein the next bot prediction corresponds to routing a subsequent conversation by:
  making the next prediction based on the updated learning model, wherein the prediction meets the threshold level of confidence; and
  routing the subsequent conversation to one or more endpoints based on the next prediction.

21. The system of claim 13, wherein the processors request the input by presenting the prediction within a set of prediction options to the agent device, and wherein sets of prediction options correspond to different routing options.

22. The system of claim 13, wherein the processors update the learning model further based on one or more other conversations associated with other classification inputs that correspond to the classification input.

23. The system of claim 13, wherein the classification input further includes one or more selections of content from the messages in the conversation.

24. The system of claim 13, wherein the set of supervision criteria further specifies one or more customized conditions to monitor in conversations involving one or more specified entities including at least one of the bot or an agent of the agent device, and further comprising instructions executable to set the threshold level of confidence based on conditions of the conversation corresponding to the customized conditions specified by the supervision criteria.

25. A non-transitory machine-readable storage medium, including instructions that, when executed by one or more processors, cause the one or more processors to perform operations including:
  storing a set of supervision criteria in memory, the set of supervision criteria including a threshold level of confidence;
  monitoring one or more messages in a conversation between a bot and a user of a client device in accordance with the set of supervision criteria;
  detecting that a bot prediction associated with the conversation fails to meet the threshold level of confidence associated with the set of supervision criteria;
  requesting input regarding the conversation from an agent device, wherein the agent device provides classification input regarding the conversation;
  handing the conversation back to the bot to continue operation in accordance with the classification input, wherein the continued bot operation includes routing the conversation to one or more endpoint devices in accordance with the classification input; and
  updating a learning model based on the classification input, wherein the bot uses the updated learning model to make a next bot prediction.

26. The non-transitory machine-readable storage medium of claim 25, wherein detecting that the bot prediction fails to meet the threshold level of confidence comprises:
  assigning a confidence score to the bot prediction; and
  comparing the assigned confidence score to the threshold level of confidence.

27. The non-transitory machine-readable storage medium of claim 25, wherein routing the conversation to the one or more endpoints occurs in real-time.

28. The non-transitory machine-readable storage medium of claim 25, further comprising instructions executable to receive input corresponding to one or more annotations, wherein the one or more annotations provide contextual or supplemental information related to one or more of the messages; and annotate the one or more messages in the conversation based on the contextual or supplemental information provided by the annotations.

29. The non-transitory machine-readable storage medium of claim 25, wherein the learning model is updated based on one or more annotated messages.

30. The non-transitory machine-readable storage medium of claim 25, further comprising instructions executable for providing contextual data associated with the classification input.

31. The non-transitory machine-readable storage medium of claim 25, wherein the classification input corresponds to a different prediction than the bot prediction, and wherein the bot routes the conversation by using the classification input in lieu of the bot prediction that failed to meet the threshold level of confidence.

32. The non-transitory machine-readable storage medium of claim 25, wherein next bot prediction corresponds to routing a subsequent conversation by:
  making the next prediction based on the updated learning model, wherein the prediction meets the threshold level of confidence; and
  routing the subsequent conversation to one or more endpoints based on the next prediction.

33. The non-transitory machine-readable storage medium of claim 25, wherein requesting the input includes presenting the prediction within a set of prediction options to the agent device, and wherein sets of prediction options correspond to different routing options.

34. The non-transitory machine-readable storage medium of claim 25, wherein updating the learning model is further based on one or more other conversations associated with other classification inputs that correspond to the classification input.

35. The non-transitory machine-readable storage medium of claim 25, wherein the classification input further includes one or more selections of content from the messages in the conversation.

36. The non-transitory machine-readable storage medium of claim 25, wherein the set of supervision criteria further specifies one or more customized conditions to monitor in conversations involving one or more specified entities including at least one of the bot or an agent of the agent device, and further comprising setting the threshold level of confidence based on conditions of the conversation corresponding to the customized conditions specified by the supervision criteria.

* * * * *